(12) United States Patent
Kiess

(10) Patent No.: US 9,236,941 B2
(45) Date of Patent: Jan. 12, 2016

(54) SYSTEM FOR IMPLEMENTING A RADIO OVER FIBER TRANSMISSION IN A PASSIVE OPTICAL NETWORK

(71) Applicant: NTT DOCOMO, Inc., Chiyoda-ku, Tokyo (JP)

(72) Inventor: Wolfgang Kiess, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 39 days.

(21) Appl. No.: 13/905,973

(22) Filed: May 30, 2013

(65) Prior Publication Data
US 2015/0365170 A1 Dec. 17, 2015

(30) Foreign Application Priority Data
Jun. 1, 2012 (EP) .................................... 12170387

(51) Int. Cl.
*H04B 10/00* (2013.01)
*H04B 7/185* (2006.01)
*H04B 10/114* (2013.01)
*H04J 14/02* (2006.01)

(52) U.S. Cl.
CPC ........ *H04B 10/1143* (2013.01); *H04J 14/0298* (2013.01)

(58) Field of Classification Search
CPC ..... H04J 1/00; H04J 2011/00; H04J 2203/00; H04J 2211/00; H04B 1/00; H04B 2001/00; H04B 2201/00; H04B 2203/00; H04B 2215/00; H04B 10/27; H04W 4/00; H04L 1/00; H04L 2001/00; H04L 2201/00; H04L 2203/00

USPC .......................................... 398/115; 455/13.1
See application file for complete search history.

(56) References Cited

U.S. PATENT DOCUMENTS

| | | | | |
|---|---|---|---|---|
| 5,179,720 A * | 1/1993 | Grube et al. | ..................... | 455/16 |
| 8,126,510 B1 * | 2/2012 | Samson et al. | ................ | 455/561 |
| 8,275,265 B2 * | 9/2012 | Kobyakov et al. | ............ | 398/115 |
| 2002/0080448 A1* | 6/2002 | Kim et al. | ..................... | 359/145 |
| 2002/0114038 A1* | 8/2002 | Arnon et al. | .................. | 359/145 |
| 2006/0239685 A1* | 10/2006 | Woo | .............................. | 398/115 |
| 2006/0253872 A1* | 11/2006 | Shoji et al. | ...................... | 725/62 |

(Continued)

OTHER PUBLICATIONS

Hung-Chang Chien; Chowdhury, A.; Zhensheng Jia; Yu-Ting Hsueh; Gee-Kung Chang, "Long-reach, 60-GHz Mm-wave optical-wireless access network using remote signal regeneration and upconversion," Optical Communication, 2008. ECOC 2008. 34th European Conference on , vol., No., pp. 1,2, Sep. 21-25, 2008.*

(Continued)

*Primary Examiner* — Ken Vanderpuye
*Assistant Examiner* — Amritbir Sandhu
(74) *Attorney, Agent, or Firm* — Brinks Gilson & Lione

(57) ABSTRACT

A system for implementing a radio over fiber (RoF) transmission in a passive optical network (PON), said passive optical network comprising a trunk line, a remote node, and a plurality of leaf nodes connected to said remote node, wherein one of said plurality of leaf nodes comprises a baseband processing unit for performing a baseband processing on a signal received via said trunk line to perform the transformation to radio over fiber by generating a radio over fiber signal and to forward the resulting radio over fiber signal to said remote node, wherein said remote node is adapted to forward the radio over fiber signal received from said leaf node to the other leaf nodes of said passive optical network.

13 Claims, 4 Drawing Sheets

(56) References Cited

U.S. PATENT DOCUMENTS

| | | | |
|---|---|---|---|
| 2008/0014992 A1* | 1/2008 | Pescod et al. | 455/562.1 |
| 2008/0145056 A1* | 6/2008 | Boldi et al. | 398/96 |
| 2008/0186143 A1 | 8/2008 | George et al. | |
| 2009/0016718 A1* | 1/2009 | Lubin et al. | 398/58 |
| 2010/0226653 A1* | 9/2010 | Yeh et al. | 398/115 |
| 2011/0310810 A1* | 12/2011 | Kenington et al. | 370/329 |
| 2012/0202507 A1* | 8/2012 | Zhang et al. | 455/450 |
| 2012/0237217 A1* | 9/2012 | Spivey et al. | 398/48 |
| 2013/0150063 A1* | 6/2013 | Berlin et al. | 455/450 |
| 2013/0201953 A1* | 8/2013 | Kang et al. | 370/329 |
| 2013/0216229 A1* | 8/2013 | Cvijetic et al. | 398/66 |
| 2014/0050482 A1* | 2/2014 | Berlin et al. | 398/115 |
| 2014/0050483 A1* | 2/2014 | Berlin et al. | 398/115 |
| 2014/0269322 A1* | 9/2014 | Li et al. | 370/236 |
| 2014/0293889 A1* | 10/2014 | Mahr et al. | 370/329 |
| 2015/0110497 A1* | 4/2015 | Zhou et al. | 398/116 |

OTHER PUBLICATIONS

China Mobile Research Institute, C-RAN: The road towards green ran. (Oct. 2011).*

Chang et al., "Key Technologies of WDM-PON for Future Converged Optical Broadband Access Networks [Invited]," Optical Communications and Networking, IEEE/OSA Journal of, vol. 1, No. 4, pp. C35,C50, Sep. 2009.*

Maamoun, K.M.; Mouftah, H.T., "Survivability models for radio-over-fiber passive optical networks (RoF-PON)/PON," Computer Engineering Conference (ICENCO), 2011 Seventh International, vol., no., pp. 13,18, Dec. 27-28, 2011.*

Yan Li; Jianping Wang; Chunming Qiao; Gumaste, A.; Yun Xu; Yinlong Xu, "Integrated Fiber-Wireless (FiWi) Access Networks Supporting Inter-ONU Communications," Lightwave Technology, Journal of, vol. 28, No. 5, pp. 714,724, Mar. 1, 2010.*

Dahlfort, S.; Laraqui, K., "Exploring the antenna lambda connection," Optical Fiber Communication Conference and Exposition (OFC/NFOEC), 2012 and the National Fiber Optic Engineers Conference, vol., no., pp. 1,3, Mar. 4-8, 2012.*

Ghazisaidi, N.; Scheutzow, M.; Maier, M., "Survivability Analysis of Next-Generation Passive Optical Networks and Fiber-Wireless Access Networks," Reliability, IEEE Transactions on, vol. 60, No. 2, pp. 479,492, Jun. 2011.*

Ayub, Waqes et al., "Radio-Over-Fiber (RoF) architecture integrating broadband wireline and wireless services," International Symposium on High Capacity Optical Networks and Enabling Technologies, 2008, pp. 102-106.

Chien, Hung-Chang et al., "Long-Reach, 60-GHz Mm-Wave Optical-Wireless Access Network Using Remote Signal Regeneration and Upconversion," ECOC, 2008, vol. 2, 137-138.

Lim, Christina et al., "Capacity Analysis for WDM Fiber-Radio Backbones with Star-Tree and Ring Architecture Incorporating Wavelength Interleaving," Journal of Lightwave Technology, vol. 21, No. 12, Dec. 2003, pp. 3308-3315.

Prince, K. et al., "Converged fixed and radio-over fiber link employing optical envelope detection and optically injected DFB laser," Conference on Optical Fiber Communication/National Fiber Optic Engineers Conference, 2008, pp. 1-3.

Zong, Lei et al., "A Novel Protection Scheme for WDM-PONs Using Waveband Filters," European Conference on Optical Communications, 2006, pp. 1-2.

Extended European Search Report for European Application No. 12170387.0, dated Nov. 14, 2012, 6 pages.

* cited by examiner

SYSTEM FOR IMPLEMENTING A RADIO OVER FIBER TRANSMISSION IN A PASSIVE OPTICAL NETWORK

RELATED APPLICATIONS

This application claims priority under 35 U.S.C. §119 to European Patent Application No. 12170387.0 filed on Jun. 1, 2012, the entire content of which is hereby incorporated by reference.

FIELD OF THE INVENTION

The present invention relates to a system and a method for implementing a radio over fiber (RoF) transmission in a passive optical network (PON).

BACKGROUND OF THE INVENTION

A passive optical network (PON) is an access network technology that connects a central office entity called "Optical Line Terminal OLT" with the customer premises equipment called "Optical Network Unit ONU" over a maximum distance of several 10 kms. The devices are connected by optical fibers that are deployed in a tree structure. PONs are currently considered as a candidate for access network sharing as the optical fiber offers high bandwidth and is already deployed to a large number of customers.

(Access) network sharing is a paradigm that allows different operators, e.g., a mobile and a fixed operator to use the 'last mile' of the network conjointly. While the fixed operator uses this access part to directly attach its customers, the mobile operator uses the access to connect base stations. In access network sharing, the two networks will run on the same hardware (i.e. devices and physical links), but will be logically separated.

Radio over fiber (RoF) is a technology widely used in the design and the deployment of base stations, in which a baseband processing unit (BBU) is connected via an optical link to the radio equipment and via this to an antenna. The BBU receives the signals from the core network of a mobile operator, e.g. in case of a LTE network the evolved packet core EPC S1 signals and converts them to RoF signals, these are transmitted via the optical link to the radio equipment/antenna unit (which will be called remote radio head in the following sections) where they are modulated on the wireless channel.

If there is provided one BBU for each remote radio head, the hardware costs are significant. It is therefore desirable to use an approach where the baseband processing resources are "pooled" such that one BBU serves several remote radio heads. It is even further preferable if the network over which the RoF signals are transmitted is shared with a fixed network operator.

Such scenarios will now be explained in somewhat more detail in the following.

Radio-over-fiber is the digitized or analogue transmission of the radio layer signals via an optical fiber. Digital radio over fiber requires large amounts of bandwidth, between 10-30 times the bytes of the S1 traffic are necessary. A typical site with 3 cells with 1 Gbps S1 traffic each (for LTE-A) thus can require 60-70 Gbps RoF capacity. It is difficult to fit this high amount of bandwidth into a (shared) PON system. The presently most advanced TDM PON systems on the market today support 10 Gbps, shared between all users of the PON. WDM PON systems might support higher bandwidths, but whether 60-70 Gbps for a single user can be supported in the near future is questionable.

One alternative is to multiplex digital RoF signals via high-capacity, long-range technologies like CWDM or DWDM (coarse/dense wavelength division multiplexing) on the shared PON. However, both systems have their disadvantages: while CWDM is cheap, it uses a lot of the optical spectrum, which might be already occupied by the different FTTH systems. DWDM requires only a low amount of spectrum, however it is quite costly.

Another alternative is analogue RoF, however this only works via short distances as the transmission distance is limited by fiber distortions and non-linearities. At the same time, there is a trend in the fiber-to-the-home community to create access networks with long optical reach. This is advantageous as the amount of central offices can be reduced, thus saving CAPEX and OPEX.

When one looks at access network sharing and RoF, it becomes clear that this trend becomes problematic: it is the goal of FTTH-operators to cover larger and larger areas from a central location for cost saving reasons; however a mobile operator can only cover a part of the area with a centralized baseband pool and analogue RoF. Thus, the coverage area is not the same, and the mobile operator has to resort to (at least in the peripheral of the network, where a transmission of RoF signals from the central office is not possible) deploy conventional base station technology, without the benefit of baseband pooling.

As mentioned above, high-capacity long-range digital technologies also have their disadvantages with respect to spectrum usage and/or cost. Furthermore, (digital) RoF transmission distance is also limited from an unexpected direction, the radio layer: certain wireless protocols require a reaction within a strict time limit. A wireless signal that requires such a reaction initially arrives at the antenna, is then transmitted via RoF to the baseband processing where it is decoded and such a reaction is calculated. The reaction is transmitted back to the antenna, again via RoF, and then sent out wirelessly. In this processing and transmission chain, each kilometer of fiber over which the RoF signal is transported adds latency due to the pure signal propagation delay, while the overall time is limited by radio layer standards.

The three known approaches for baseband pooling and/or network sharing are illustrated in FIG. 1. The first one (shown on the left-hand side in FIG. 1) is the centralized baseband pooling at the PON's central office location with analogue or digital RoF. This has the above outlined limitations. The second solution (shown in the center of FIG. 1) is a distributed baseband processing, in which each unit connected to the passive optical network is a complete base station. Obviously, this approach does not allow realizing baseband pooling gains and only can achieve network sharing.

The last know solution (shown on the right-hand side in FIG. 1) is one in which the baseband processing unit is connected to one of the leaf nodes, and the remote radio heads of the other leaf nodes are connected to it via a dedicated network. Here, the length of the PON tree trunk is not problematic; however, the mobile operator has to deploy new fibers to attach the remote radio heads, thus not being able to realizing the network sharing gains.

It is therefore desirable to have a system where baseband pooling gains and network sharing gains can be achieved simultaneously, and even in cases where the PON covers a long distance. None of the existing solutions has such capabilities.

SUMMARY OF THE INVENTION

According to one embodiment there is provided a system for implementing a radio over fiber (RoF) transmission in a passive optical network (PON), said passive optical network comprising a trunk line, a remote node, and a plurality of leaf nodes connected to said remote node, wherein one of said plurality of leaf nodes comprises a baseband processing unit for performing a baseband processing on a signal received via said trunk line to perform the transformation to radio over fiber by generating a radio over fiber signal and to forward the resulting radio over fiber signal to said remote node, wherein said remote node is adapted to forward the radio over fiber signal received from said leaf node to the other leaf nodes of said passive optical network.

By such a configuration a baseband pooling gain can be achieved and the PON can be shared between a fixed network operator and a mobile network operator.

According to one embodiment one or more of said other leaf nodes comprise a remote radio head to transmit the received radio over fiber signal as a radio signal.

This allows the usage of the baseband pooling gains by replacing base stations through remote radio heads.

According to one embodiment said signal which is received via said trunk line by said one of said plurality of leaf nodes is a signal received from the core network of a mobile network operator.

This enables the usage of the system by a mobile network operator.

According to one embodiment said signal which is received via said trunk line is a S1 signal.

This is a specific implementation for a LTE network.

According to one embodiment said radio over fiber signal generated in said one of said plurality of leaf nodes is transmitted in a waveband range outside the bands suitable for covering a range which includes the length of the trunk line and a leaf line but in a band suitable for covering a range communication covering the length which includes the distance from one leaf node to another leaf node via said remote node.

This enables an efficient usage of the optical frequency resources.

According to one embodiment the length of said trunk line is longer than the length from the remote node to a leaf node.

This is a specific configuration where the usage of a system according to the invention is advantageous for covering long range trunk lines.

According to one embodiment said passive optical network is shared between a fixed and a mobile operator such that the fixed operator uses the PON to transmit FTTH signals, and the mobile operator uses the PON, the remote node and the leaf nodes to transmit a signal from its core to said one of said leaf nodes and radio over fiber signals from said one of said leaf nodes to other ones of said leaf nodes via said remote node.

This is an advantageous implementation for access network sharing.

According to one embodiment the RoF signal is transmitted in analogue form.

This enables a cost efficient implementation.

According to one embodiment there is provided a system for implementing a radio over fiber (RoF) transmission, said system comprising:

One or more first systems according to one of the embodiments of the invention;

one or more second systems for implementing a RoF transmission, wherein a baseband processing unit is located at the optical line terminal, remote radio heads are located at PON leaf nodes, and the RoF signals are transmitted from the optical line terminal to the leaf nodes via the trunk line and the leaf lines of the PON.

This enables wide area coverage by two flavours of RoF transmission.

According to one embodiment the one or more first systems are used to cover areas which are more far away from the optical line terminal;

the one or more second systems are used to cover areas which are less far away from the optical line terminal.

This is a specific implementation for wide area coverage.

According to one embodiment there is provided a method for implementing a radio over fiber (RoF) transmission in a passive optical network (PON), said passive optical network comprising a trunk line, a remote node, and a plurality of leaf nodes connected to said remote node, said method comprising:

wherein performing a baseband processing in a baseband processing unit of one of said plurality of leaf nodes on a signal received via said trunk line to perform the transformation to radio over fiber by generating a radio over fiber signal;

forwarding the resulting radio over fiber signal to said remote node, and forwarding the radio over fiber signal received from said at least one leaf node by said remote node to the other leaf nodes of second passive optical network.

This is an implementation of a method according to an embodiment of the invention.

DETAILED DESCRIPTION OF THE PREFERRED EMBODIMENTS

Figure 1:
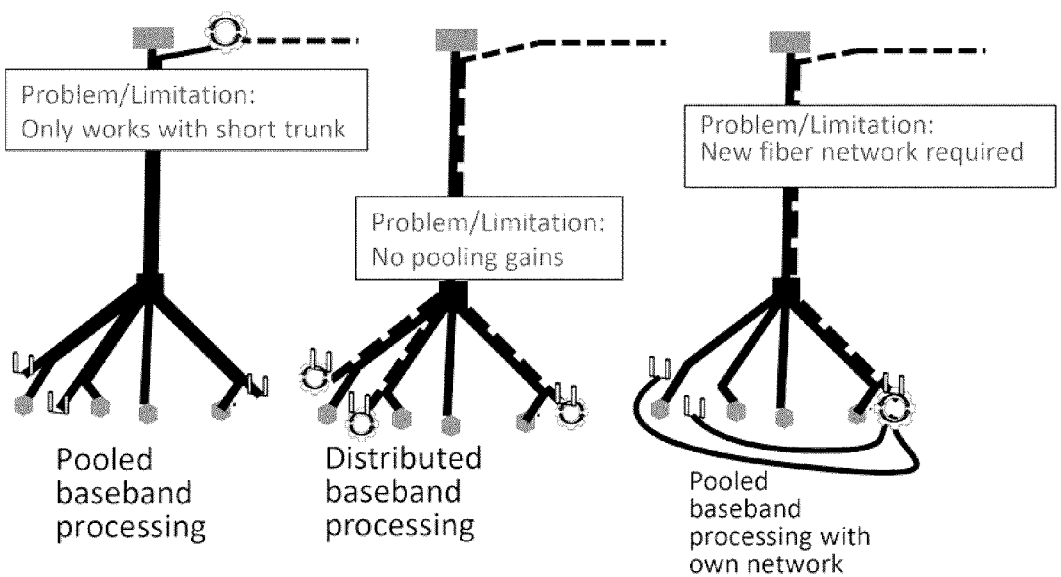
FIG. 1 schematically illustrates three different approaches of PON implementations.

According to one embodiment there is proposed a system for sharing the access network between a fixed and a mobile operator in which the operator can realize baseband processing pooling gains by using radio over fiber technology. For that purpose there is used a specifically designed remote node of a passive optical network which is capable to create a signal path between a first PON leaf node and the other PON leaf nodes. Such a remote node with this capability is—in a different context—described in the European patent application no. 11182745.7 titled "System for interconnecting nodes attached to a passive optical network" which has been filed by the same applicant as the present application and which is incorporated herein by reference. Details of the configuration of such a specific remote node which can forward a RoF signal received from one leaf node to the other leaf nodes of a PON can be found in this application. With this specific remote node the baseband processing unit can be installed in a first one of the PON leaf nodes, and the remote radio heads can be installed in the other PON leafs. The first one of the PON leafs may then receive the S1 signal over the PON, carry out the baseband processing to generate the RoF signal, and then forward the RoF signal to the other leaf nodes of the PON via the specific remote node which is capable to forward or direct the RoF signal to the other leaf nodes of the PON.

This is especially advantageous if the feeder fiber (the trunk of the PON tree) becomes very long, and thus a radio over fiber (RoF) transmission is difficult or impossible due to the higher attenuation or high cost for suitable transmission equipment. The long distance is then covered by the low-bandwidth S1 signal and the high-bandwidth or analogue RoF signal needs to only cover the (relatively short) distance between the remote node and the leaf nodes.

This is a system that allows implementing a pooled baseband processing in case the access network is shared between fixed and mobile operator and the feeder of the shared PON is long.

First of all, this results in fewer sites with high complexity (the sites that only host a remote radio heads are simple, thus cheap and less prone to errors). Furthermore, with the current trend to install long range PONs, a fixed fiber to the home network will cover a large area that cannot be covered with conventional (analogue) RoF technology from the central office to the PON leafs or requires expensive, high speed digital transmission equipment for digital RoF. The embodiment allows to also cover this larger area, by allowing for distributed baseband processing pools.

According to one embodiment there is provided a system in which the baseband processing unit is located in one of the leaf nodes of a shared PON, and the remote node is specifically modified such that this BBU can transmit the RoF signals via the remote node to the other PON leaf nodes. There, remote radio heads are attached, and the system is able to realize baseband pooling gains also in case the trunk of the PON tree is long, since the RoF signals only have to traverse the branches of the fiber tree, but not the trunk.

Figure 2:
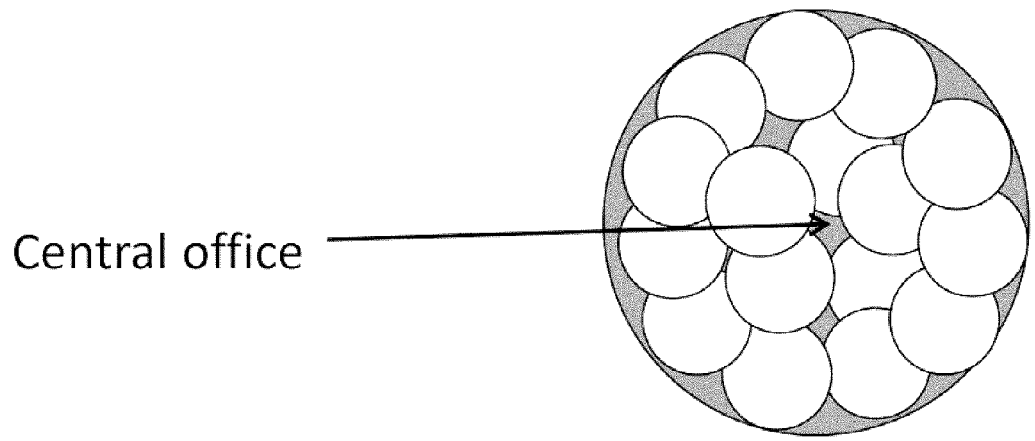
FIG. 2 schematically illustrates a structure where multiple PONs are connected to a central office.

With this, a fixed operator can create a fiber to the home network with long trunk lines (long reach PONs) and thus realize the reduction of central offices, while at the same time the mobile operator can cover the area with base stations that apply baseband pooling technology. The overall coverage of an area by such a system is outlined in FIG. 2. The gray area represents the coverage by the fiber to the home system. On top of this, the mobile operator installs its RoF system as illustrated by the white circles in FIG. 2.

Figure 3:
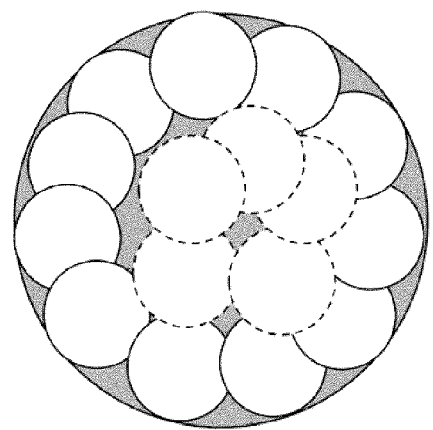
FIG. 3 schematically illustrates a structure where multiple PONs are connected to a central office according to an embodiment of the invention.

According to one embodiment the mobile operator installs its RoF system in two flavours as illustrated in FIG. 3:

The part that is reachable with RoF from the central office will be covered with conventional technology (i.e. using RoF transmission with the BBU close to the central office). This is illustrated by the white circles drawn by dashed lines in the middle of the grey circle.

The part of the area that is too far away from the central office to be covered is covered by using the system where the BBU is installed at one of the leaf nodes and the RoF signal is distributed from this leaf node to the other leaf nodes via the remote node. This is illustrated by the white circles drawn by solid lines in the periphery which surround the dashed circles in the center.

With this configuration, fixed and mobile operator can thus cover the same area even in the presence of long range PONs, thus realizing baseband pooling gains, sharing gains, and central office consolidation gains all on the same system.

Now further embodiments of the invention will be described.

Figure 4:
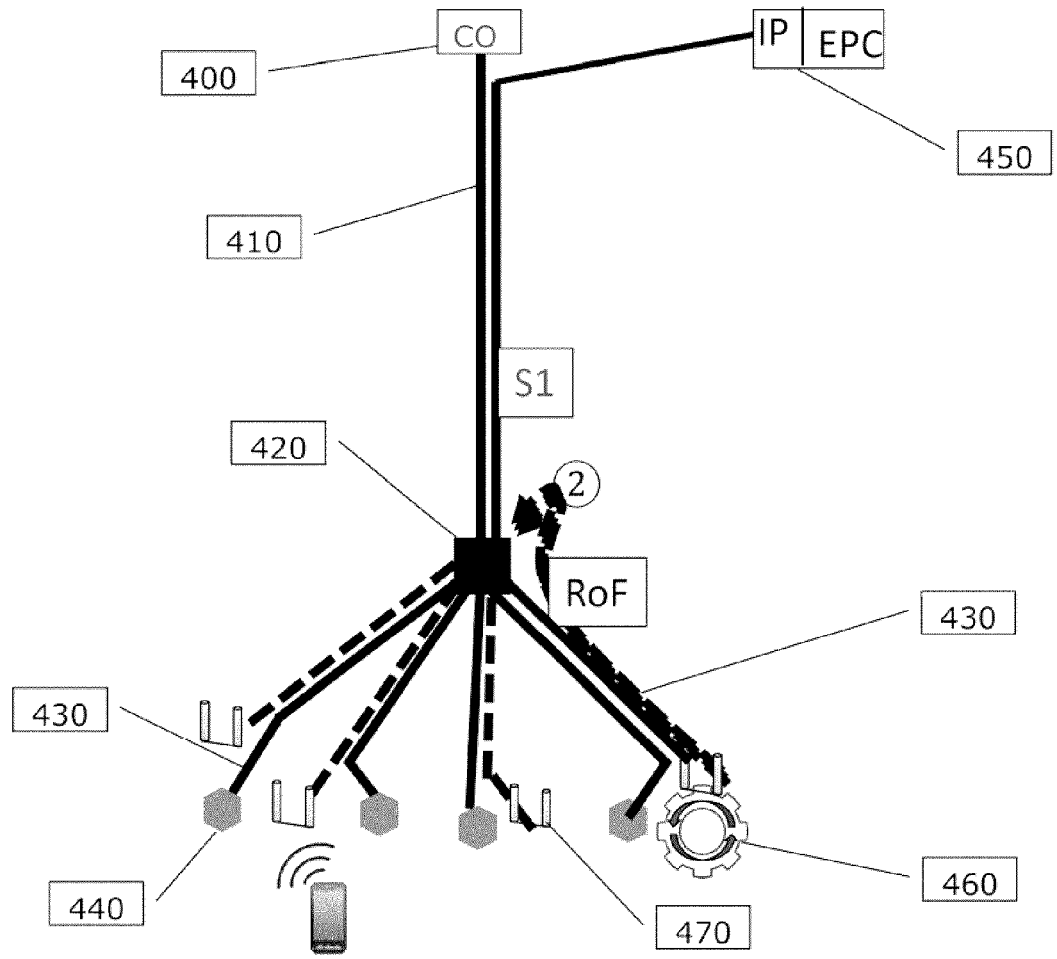
FIG. 4 schematically illustrates a system according to an embodiment of the invention.

A more detailed overview of an embodiment of the invention can be found in FIG. 4. There is shown a PON for implementing a Fiber to the home (FTTH) infrastructure by connecting a central office CO 400 via a trunk line 410, a remote node 420, and leaf lines 430 to optical leaf nodes 440. This FTTH infrastructure is now according to one embodiment shared by a mobile operator which implements a radio over fiber system using this infrastructure. The mobile operator has a core network 450 (e.g. a evolved packet core, EPC) which delivers a packet oriented signal, e.g. the S1 signal, which should be distributed to its base stations. The S1 signal is transmitted via the trunk line 410 and one of the leaf lines to one of the leaf nodes.

In order to make use of baseband pooling gains there is provided a baseband processing unit (BBU) 460 at the leaf node which receives the S1 signal. The BBU then carries out a baseband processing and generates a RoF signal. This RoF signal, which is illustrated by the dashed lines in FIG. 4, is then transmitted from the leaf node which comprises the BBU 460 to the remote node 420 via a leaf line 430 and from there to the other leaf nodes 470, also via a leaf line 430. These other leaf nodes are provided with remote radio heads RRH 470 for transmitting the radio signal via the air interface to the mobile terminals.

Therefore, according to the embodiment, the baseband processing unit is located in one of the PON leaf nodes, and the remote radio heads are located in one or multiple other PON leaf nodes. The remote node 420 of the PON is modified such that it creates a bidirectional channel between the BBU and the RRHs. The S1 traffic is transmitted via the "normal" channel over the PON to the BBU, there it is transformed to RoF signals, and the newly created signal path is used to exchange the RoF signals between BBU and RRHs.

The BBU at the leaf node therefore allows a baseband processing pooling at the PON leaf node. The RoF signal which is transmitted via the remote node interconnects the baseband processing pool with the RRHs at the other leaf nodes, and the trunk line connects the baseband processing pool implemented by the BBU with the core network of the mobile operator (in case of an LTE network the EPC).

Since in typical configurations the connection between the leaf nodes and the remote node is relatively short, especially compared to the length of the trunk line, the RoF signal can be transmitted with higher loss, and therefore in an unused spectrum range (e.g. in the waterpeak region). The relatively long distance between the core network and the BBU then is covered by transmitting the packet oriented signal from the core (e.g. the S1 signal). Therefore only for transmitting the S1 signal there is a need to make use of the low attenuation optical spectrum resources, and for the transmission of the RoF signal a different part of the spectrum with higher loss can be used.

Furthermore, if the connection between the leaf nodes and the remote node is sufficiently short, the RoF signal can be generated and transmitted also as analogue RoF signal as the short distance reduces the optical non-linearities.

It should be mentioned here that according to one embodiment the baseband processing unit needs not to carry out a "full baseband processing", which means a "part" of the baseband processing may also be shifted to the remote radio heads. It should be noted that the baseband processing may be implemented by any means which at least partly carries out the baseband processing normally carried out by a base station so that the functionality of the baseband processing which is taken over by the baseband processing unit can be carried out centrally by one unit for several remote radio heads which thereby become less complicated and less costly than a "normal base station" because the BBU takes over at least a part of their baseband processing tasks.

Figure 5:
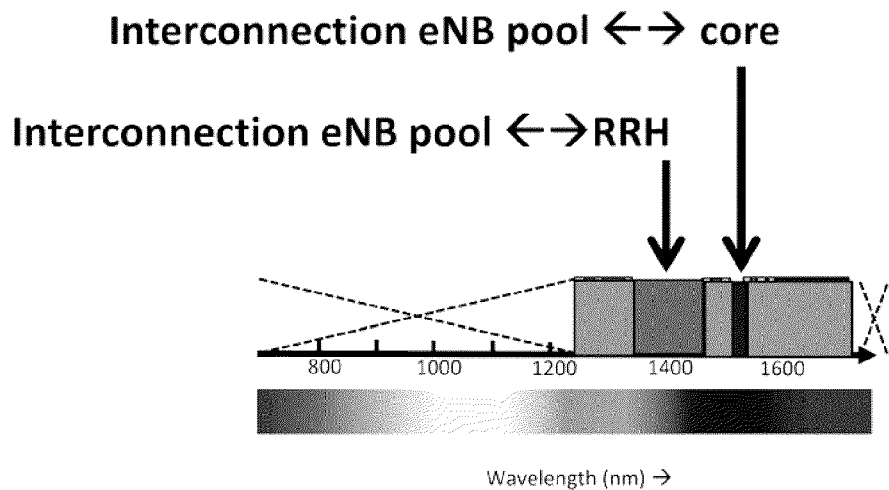
FIG. 5 schematically illustrates a frequency assignment according to an embodiment of the invention.

The wavelength assignment in this embodiment is schematically illustrated in FIG. 5. By transmitting the S1 signal from the core to the leaf node which has the BBU it is necessary to use only one wavelength in the spectrum range where the resources are limited and which can be used for long range communication (the low attenuation spectrum). By generating the RoF signal at the leaf node so that it has from there to travel only the (relatively short) distance to the remote node and the other leaf nodes, it is possible to transmit the RoF signal at wavelengths with higher attenuation which is a part of the spectrum where the resources are less limited. Furthermore, if this distance is sufficiently short, the transmission of the RoF signal can also be made in analogue form.

Figure 6:
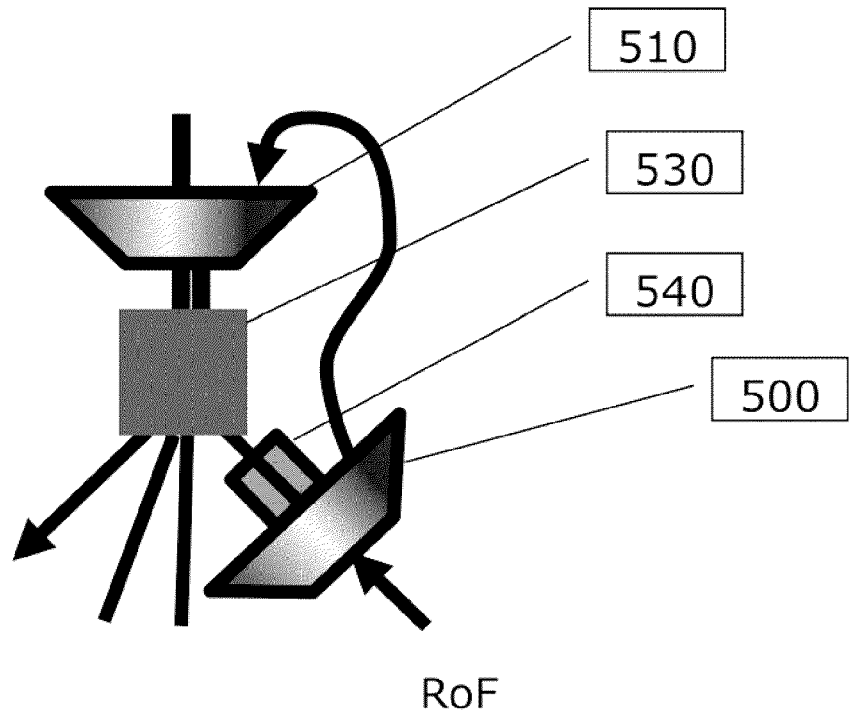
FIG. 6 schematically illustrates a remote node according to an embodiment of the invention.

In the following a more detailed view of the architecture of the remote node which can be used in connection with embodiments of the invention will be explained by referring to FIG. 6. It consists of the passive splitter 530 (which can be either a power splitter in case of a TDM PON or a wavelength splitter in case of a WDM PON), two waveband (de-)multiplexers 500 and 510, and one filter 540. The RoF signal from the leaf node where the BBU is located is fed to the waveband (de-)multiplexer 500 and extracted, then it is forwarded to the other waveband (de-)multiplexer 510 where it is fed to the splitter 530 and from there distributed to the other leaf nodes. The filter 540 prevents a collision between the RoF signal received from the BBU and the one which is fed into the splitter and distributed to the other leaf nodes.

The thus modified splitter 530 forms a remote node which can redirect a RoF signal which it has received from a BBU located at a leaf node to the other leaf nodes of the PON.

An even more detailed description of such a modified remote node, albeit in a different context, can be found in European patent application no. 11182745.7 which is incorporated herein by reference.

Figure 7:
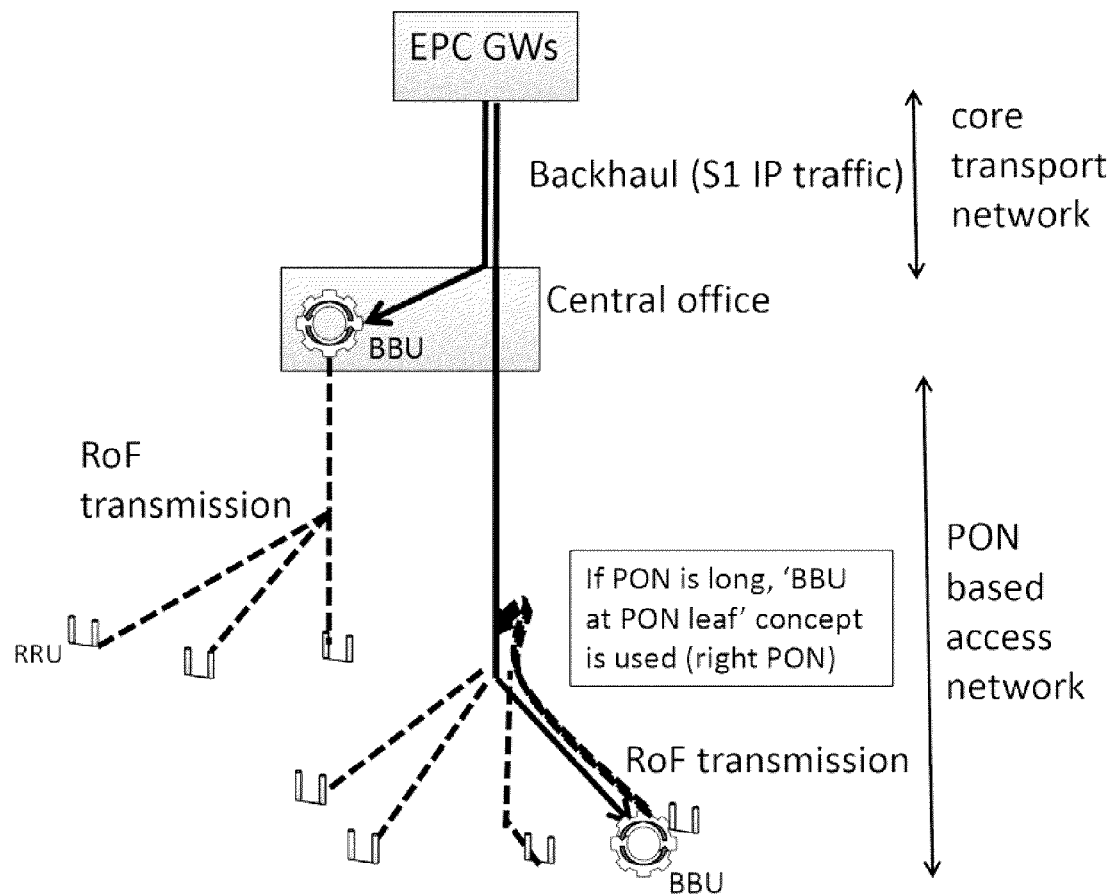
FIG. 7 schematically illustrates a system according to an embodiment of the invention.

A further embodiment will now be described in connection with FIG. 7. Therein there is shown how a PON can be used by a mobile operator using two different flavours of RoF transmission.

From an EPC GW the backhaul S1 IP traffic is transmitted via a core transport network to a central office. From there the distribution to the leaf nodes is done in two different ways via a PON. If the PON is short, then the baseband pooling can be carried out in the central office and the RoF signal can be sent through the whole PON to the leaf nodes and their remote radio units RRU or remote radio heads. This is illustrated by the PON on the left-hand side where the whole path from the BBU in the central office to the leaf nodes is shown by the dashed line, thereby indicating that the RoF signal travels via the trunk line and the leaf lines of the PON.

If the PON is long a different configuration is used where the S1 traffic travels to the BBU located at a leaf node of the PON and the RoF signal is generated and directed to the other leaf nodes via the remote node. This is illustrated by the right-hand PON shown in FIG. 7.

While the present invention has been described by exemplary embodiments, it will be understood that these embodiments may be modified without departing form the scope of the claims.

What is claimed is:

1. A system for implementing a radio over fiber (RoF) transmission in a passive optical network (PON), said passive optical network comprising
a trunk line,
a remote optical node, which is connected to said trunk line, and
a plurality of leaf nodes connected to said remote optical node and via said remote optical node to said trunk line, wherein
one of said plurality of leaf nodes comprises a baseband processing unit for performing a baseband processing on a signal received via said trunk line and said remote optical node to perform the transformation to radio over fiber by generating a radio over fiber signal and to forward the resulting radio over fiber signal to said remote optical node, wherein
said remote optical node is adapted to forward the radio over fiber signal received from said leaf node to the other leaf nodes of said passive optical network.

2. The system of claim 1, wherein
one or more of said other leaf nodes comprise a remote radio head to transmit the received radio over fiber signal as a radio signal.

3. The system of claim 1, wherein
said signal which is received via said trunk line by said one of said plurality of leaf nodes is a signal received from the core network of a mobile network operator.

4. The system of claim 3, wherein said signal which is received via said trunk line is a S1 signal.

5. The system of claim 1, wherein
said radio over fiber signal generated in said one of said plurality of leaf nodes is transmitted in a waveband range outside the bands suitable for covering a range which includes the length of the trunk line and a leaf line but in a band suitable for covering a range communication covering the length which includes the distance from one leaf node to another leaf node via said remote optical node.

6. The system of claim 1, wherein a length of said trunk line is longer than a length from the remote optical node to a leaf node.

7. The system of claim 1, wherein
said passive optical network is shared between a fixed and a mobile operator such that
the fixed operator uses the PON to transmit FTTH signals, and
the mobile operator uses the PON, the remote optical node and the leaf nodes to transmit a signal from its core to said one of said leaf nodes and radio over fiber signals from said one of said leaf nodes to other ones of said leaf nodes via said remote optical node.

8. The system of claim 1, wherein the RoF signal is transmitted in analogue form.

9. A system for implementing a radio over fiber (RoF) transmission, said system comprising:
One or more first systems according to claim 1;
One or more second systems for implementing a RoF transmission, wherein a baseband processing unit is located at an optical line terminal, remote radio heads are located at PON leaf nodes, and the RoF signals are transmitted from the optical line terminal to the leaf nodes via the trunk line and the leaf lines of the PON.

10. The system of claim 9, wherein
the one or more first systems are used to cover areas which are more far away from the optical line terminal;

the one or more second systems are used to cover areas which are less far away from the optical line terminal.

11. A method for implementing a radio over fiber (RoF) transmission in a passive optical network (PON), said passive optical network comprising
- a trunk line,
- a remote optical node, which is connected to said trunk line, and
- a plurality of leaf nodes connected to said remote optical node and via said remote optical node to said trunk line, said method comprising:
- performing a baseband processing in a baseband processing unit of one of said plurality of leaf nodes on a signal received via said trunk line and said remote optical node to perform the transformation to radio over fiber by generating a radio over fiber signal;

forwarding the resulting radio over fiber signal to said remote optical node, and
- forwarding the radio over fiber signal received from said at least one leaf node by said remote optical node to the other leaf nodes of said passive optical network.

12. The method of claim 11, wherein
- one or more of said other leaf nodes comprise a remote radio head to transmit the received radio over fiber signal as a radio signal.

13. The method of claim 11, wherein
- said signal which is received via said trunk line by said one of said plurality of leaf nodes is a signal received from the core network of a mobile network operator.

* * * * *